US010447082B2

United States Patent
Liu (10) Patent No.: US 10,447,082 B2
(45) Date of Patent: Oct. 15, 2019

(54) WIRELESS POWER TRANSMITTER CIRCUIT AND CONTROL CIRCUIT AND CONTROL METHOD THEREOF

(71) Applicant: RICHTEK TECHNOLOGY CORPORATION, Zhubei, HsinChu (TW)

(72) Inventor: Kuo-Chi Liu, Hsiinchu (TW)

(73) Assignee: RICHTEK TECHNOLOGY CORPORATION, Zhubei, Hsinchu (TW)

( * ) Notice: Subject to any disclaimer, the term of this patent is extended or adjusted under 35 U.S.C. 154(b) by 217 days.

(21) Appl. No.: 15/600,372

(22) Filed: May 19, 2017

(65) Prior Publication Data

US 2018/0212464 A1    Jul. 26, 2018

(30) Foreign Application Priority Data

Jan. 22, 2017  (CN) .......................... 2017 1 0053015

(51) Int. Cl.
| | |
|---|---|
| *H02J 50/10* | (2016.01) |
| *H02J 7/02* | (2016.01) |
| *H02J 5/00* | (2016.01) |
| *H02J 50/12* | (2016.01) |
| *H04B 5/00* | (2006.01) |
| *H02M 7/48* | (2007.01) |

(52) U.S. Cl.
CPC .............. *H02J 50/10* (2016.02); *H02J 5/005* (2013.01); *H02J 7/025* (2013.01); *H02J 50/12* (2016.02); *H02M 2007/4818* (2013.01); *H04B 5/0037* (2013.01)

(58) Field of Classification Search
CPC .. H02J 50/10; H02J 7/025; H02J 50/12; H02J 5/005; H02M 2007/4818; H04B 5/0037
See application file for complete search history.

(56) References Cited

U.S. PATENT DOCUMENTS

| | | | |
|---|---|---|---|
| 2014/0103891 A1* | 4/2014 | Stratakos | G05F 1/67 323/271 |
| 2017/0085131 A1* | 3/2017 | Liu | H03H 7/38 |
| 2019/0027968 A1* | 1/2019 | Leem | H02J 7/02 |

* cited by examiner

*Primary Examiner* — Jared Fureman
*Assistant Examiner* — Duc M Pham
(74) *Attorney, Agent, or Firm* — Tung & Associates (57) ABSTRACT

A wireless power transmitter circuit includes a power inverter circuit, a resonant transmitter circuit and a control circuit. The power inverter circuit converts a DC power to an AC output power which includes an AC output current. The resonant transmitter circuit, including a variable capacitor circuit, converts the AC output power to a resonant wireless power which includes a resonant current. The control circuit generates an impedance control signal according to a resonant current related signal and a current reference signal, for controlling the impedance of the variable capacitor circuit to regulate the resonant current or the AC output current substantially at a predetermined current level.

22 Claims, 5 Drawing Sheets

WIRELESS POWER TRANSMITTER CIRCUIT AND CONTROL CIRCUIT AND CONTROL METHOD THEREOF

CROSS REFERENCE

The present invention claims priority to CN 201710053015.8, filed on Jan. 22, 2017.

BACKGROUND OF THE INVENTION

Field of Invention

The present invention relates to a wireless power transmitter circuit, particularly a wireless power transmitter circuit capable of operating in a constant current mode. The present invention also relates to a control circuit and a control method for use in the wireless power transmitter circuit.

Description of Related Art

Figure 1:
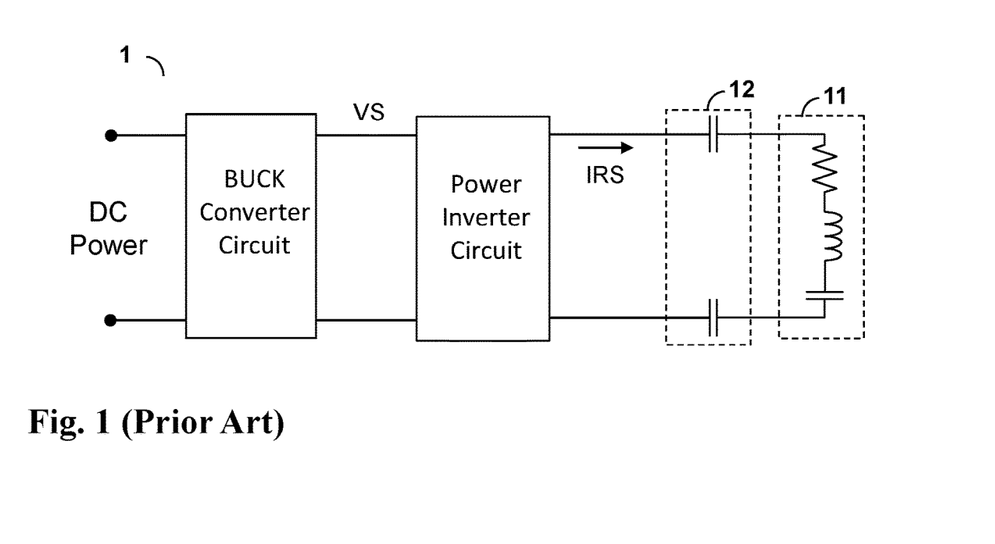
FIG. 1 shows a schematic diagram of a prior art wireless power transmitter circuit.

It is desired for a wireless power transmitter circuit to be capable of operating in a constant current mode, providing a constant current. Conventional wireless power transmitter circuits need to operate according to a high input voltage, which leads to many problems. FIG. 1 shows a prior art wireless power transmitter circuit (wireless power transmitter circuit 1) which comprises a buck converter circuit, a power inverter circuit, a resonant transmitter circuit 11 and a resonant matching circuit 12, wherein the resonant current IRS is determined by the input voltage VS of the power inverter circuit.

Figure 2:
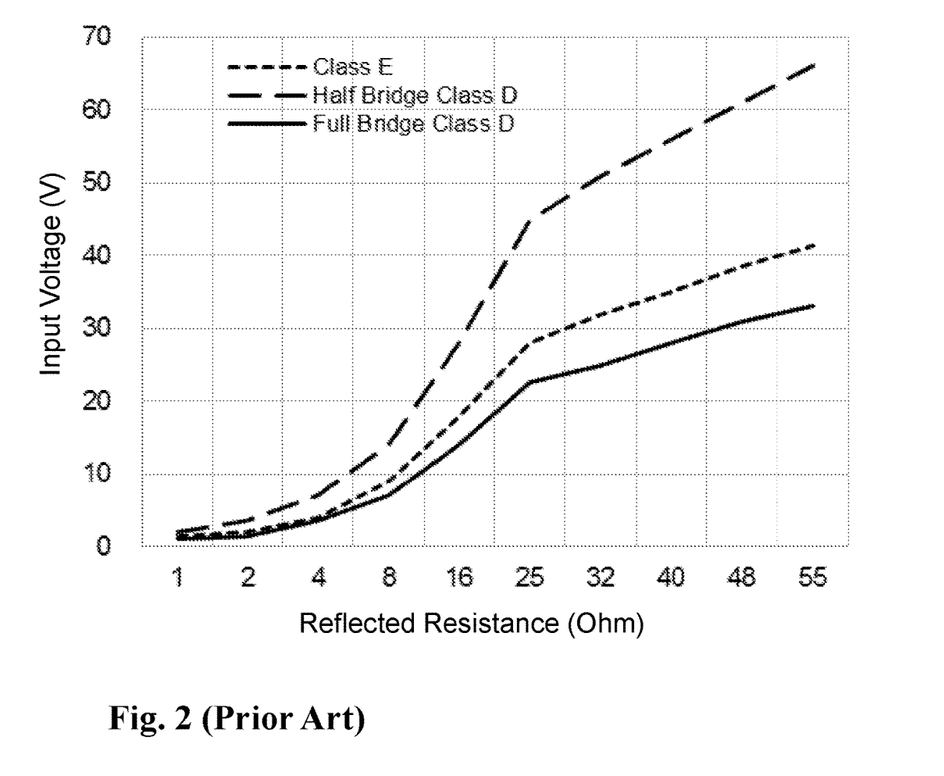
FIG. 2 shows simulation characteristic curves corresponding to the prior art as shown in FIG. 1.

The prior art circuit in FIG. 1 has drawbacks that it requires a relatively high level of input voltage, a relatively wide voltage control range and a digital to analog converter with relatively high resolution in order to meet the requirement for resonant current control. FIG. 2 shows characteristic curves of input voltage level versus corresponding reflected resistance when the wireless power transmitter circuit 1 operates in 16 W. As shown in the figure, a full-bridge class D power inverter requires an input voltage range of 0-33V, a class E power inverter requires an input voltage range of 0-42V, and a half-bridge class D power inverter requires an input voltage range of 0-66V. Besides, a digital to analog converter with a relatively high resolution is also required, especially when the reflected resistance is low.

Compared to the prior art in FIG. 1, the present invention is capable of achieving a constant current mode by analog control, with a smaller input voltage range or a fixed input voltage; the present invention has advantages such as simpler circuit architecture, faster response and lower cost.

SUMMARY OF THE INVENTION

From one perspective, the present invention provides a wireless power transmitter circuit comprising: a power inverter circuit which includes at least a first switching device, and is configured to operably convert a first DC power to an AC output power, wherein the AC output power includes an AC output current; a resonant transmitter circuit which includes at least a transmitter coil and a variable capacitor circuit, and is configured to operably convert the AC output power to a resonant wireless power, wherein the resonant wireless power includes a resonant current; and a control circuit, configured to operably generate an impedance control signal according to a difference between a current reference signal and a resonant current related signal, for controlling an impedance of the variable capacitor circuit to regulate the resonant current or the AC output current substantially at a predetermined current level, wherein the resonant current related signal is a signal related to the resonant current.

In one embodiment, the variable capacitor circuit includes a varactor, and the impedance control signal is an analog signal which is coupled to a control terminal of the varactor to control the impedance of the varactor in an analog manner wherein the impedance of the varactor is controllable to change continuously and non-stepwisely.

In one embodiment, the control circuit includes a peak detection circuit, configured to operably generate a peak current signal according to a peak value of the resonant current related signal; a transconductance amplifier circuit, configured to operably generate a difference signal according to the peak current signal and a reference current signal; an integration filter circuit, configured to operably generate a filtered current signal by integrating and filtering the difference signal; and a buffer amplifier circuit, configured to operably generate an impedance control bias voltage according to the filtered current signal, for controlling the control terminal of the varactor so as to control the impedance of the varactor in the analog manner; wherein the impedance control signal includes the impedance control bias voltage.

In one embodiment, the wireless power transmitter circuit generates the resonant current related signal according to a conduction current of the switching device.

In one embodiment, the variable capacitor circuit includes a capacitor and a capacitor switch which are connected to each other, and the impedance control signal controls the switching of the capacitor switch for controlling the impedance of the variable capacitor circuit.

In one embodiment, the power inverter circuit is a half-bridge class D inverter circuit, a full-bridge class D inverter circuit, or a class E inverter circuit.

In one embodiment, the duty cycle of the first switching device is substantially 50 time % and is slightly less than 50 time %.

In one embodiment, the power inverter circuit includes at least four switching devices which include the first switching device, and the control circuit generates a mode control signal for controlling the four switching devices such that the power inverter circuit includes one of the following operation modes: (1) one of the four switching devices is constantly conductive and another one of the four switching devices is constantly non-conductive, such that the power inverter circuit operates as a half-bridge class D inverter circuit; or (2) the four switching devices operate as a full-bridge class D inverter circuit.

In one embodiment, the wireless power transmitter circuit further includes a boost converter circuit, wherein the control circuit generates an operation control signal for controlling the boost converter circuit to convert a second DC power to the first DC power.

From another perspective, the present invention provides a control circuit configured to operably control a wireless power transmitter circuit which comprises: a power inverter circuit including at least a first switching device, and being configured to operably convert a first DC power to an AC output power, wherein the AC output power includes an AC output current; and a resonant transmitter circuit which includes at least a transmitter coil and a variable capacitor circuit, and is configured to operably convert the AC output power to a resonant wireless power, wherein the resonant wireless power includes a resonant current; wherein the control circuit comprises: a current signal processing circuit, configured to operably generate a difference signal according to a current reference signal and a resonant current related signal, wherein the resonant current related signal is a signal related to the resonant current; and a signal conversion circuit, configured to operably generate an impedance control signal according to the difference signal, for controlling the impedance of the variable capacitor circuit to regulate the resonant current or the AC output current substantially at a predetermined current level.

In one embodiment, the current signal processing circuit includes a peak detection circuit, configured to operably generate a peak current signal according to a peak value of the resonant current related signal; and a transconductance amplifier circuit, configured to operably generate the difference signal according to the peak current signal and the reference current signal; and the signal conversion circuit includes an integration filter circuit, configured to operably generate a filtered current signal by integrating and filtering the difference signal; and a buffer amplifier circuit, configured to operably generate an impedance control bias voltage according to the filtered current signal to control the control terminal of the varactor so as to control the impedance of the varactor in the analog manner wherein the impedance of the varactor is controllable to change continuously and non-stepwisely; wherein the impedance control signal includes the impedance control bias voltage.

From another perspective, the present invention provides a method for use in controlling a wireless power transmitter circuit which comprises: a power inverter circuit including at least a first switching device, and being configured to operably convert a first DC power to an AC output power, wherein the AC output power includes an AC output current; and a resonant transmitter circuit which includes at least a transmitter coil and a variable capacitor circuit, and is configured to operably convert the AC output power to a resonant wireless power, wherein the resonant wireless power includes a resonant current, the method comprising: generating a difference signal according to a current reference signal and a resonant current related signal, wherein the resonant current related signal is a signal related to the resonant current; and generating an impedance control signal according to the difference signal, for controlling the impedance of the variable capacitor circuit to regulate the resonant current or the AC output current substantially at a predetermined current level.

In one embodiment, the variable capacitor circuit includes a varactor, wherein the step of generating the difference signal includes: generating a peak current signal according to a peak value of the resonant current related signal; and generating the difference signal according to the peak current signal and a reference current signal; and the step of generating the impedance control signal includes: generating a filtered current signal by integrating and filtering the difference signal; and generating an impedance control bias voltage according to the filtered current signal to control the control terminal of the varactor so as to control the impedance of the varactor in the analog manner wherein the impedance of the varactor is controllable to change continuously and non-stepwisely; wherein the impedance control signal includes the impedance control bias voltage.

In one embodiment, the resonant current related signal is generated according to a conduction current of the switching device.

In one embodiment, the variable capacitor circuit includes a capacitor and a capacitor switch which are connected to each other, and the step of controlling the impedance of the variable capacitor circuit includes controlling the switching of the capacitor switch for controlling the impedance of the variable capacitor circuit.

In one embodiment, the power inverter circuit includes at least four switching devices which include the first switching device, and the method further includes generating a mode control signal for controlling the four switching devices such that the power inverter circuit includes one of the following operation modes: (1) one of the four switching devices is constantly conductive and another one of the four switching devices is constantly non-conductive, such that the power inverter circuit operates as a half-bridge class D inverter circuit; or (2) the four switching devices operate as a full-bridge class D inverter circuit.

In one embodiment, the wireless power transmitter circuit further includes a boost converter circuit, and the method further includes generating an operation control signal for controlling the boost converter circuit to convert a second DC power to the first DC power.

The objectives, technical details, features, and effects of the present invention will be better understood with regard to the detailed description of the embodiments below.

DESCRIPTION OF THE PREFERRED EMBODIMENTS

The drawings as referred to throughout the description of the present invention are for illustration only, to show the interrelations between the circuits and the signal waveforms, but not drawn according to actual scale.

Figure 3:
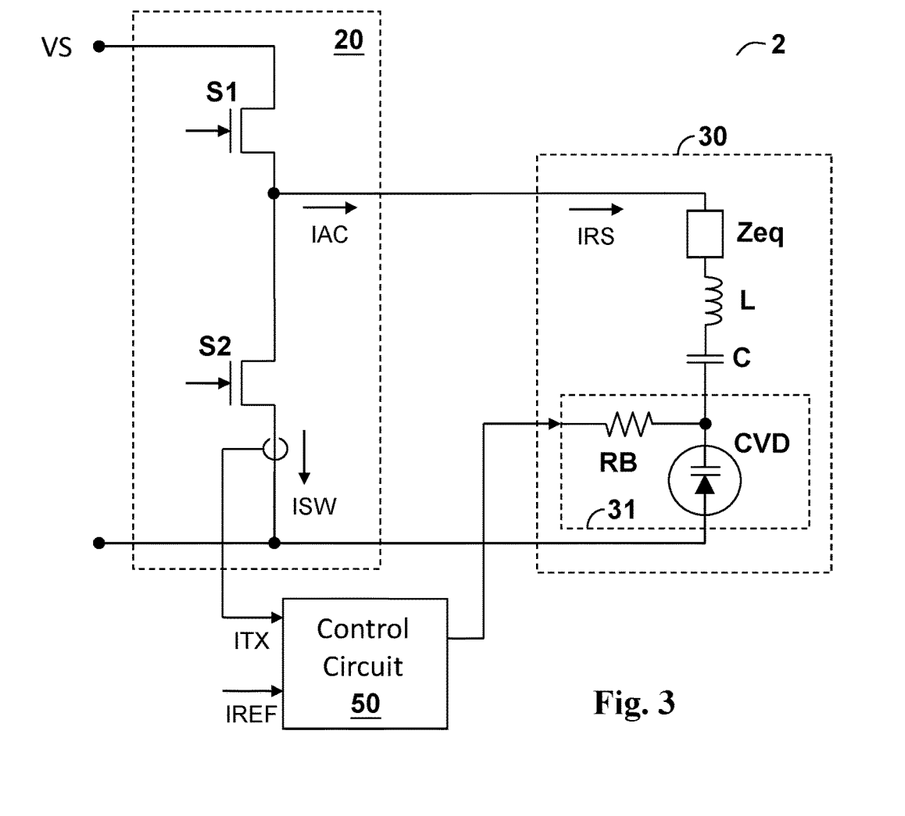
FIG. 3 shows a schematic diagram of a wireless power transmitter circuit according to an embodiment of the present invention.

FIG. 3 shows one embodiment of the wireless power transmitter circuit according to the present invention (wireless power transmitter circuit 2), wherein the wireless power transmitter circuit 2 comprises a power inverter circuit 20, a resonant transmitter circuit 30, and a control circuit 50. The power inverter circuit 20 includes at least a first switching device (for example the switch S1 or S2 as shown in the figure). In this embodiment, there are two switching devices. The switches S1 and S2 operate with an operating frequency (for example 6.78 MHz) to convert a first DC power to an AC output power, wherein the first DC power includes a first DC voltage VS and the AC output power includes an AC output current IAC. The resonant transmitter circuit 30 includes at least a transmitter coil L and a variable capacitor circuit 31; the resonant transmitter circuit 30 is configured to operably convert the AC output power into a resonant wireless power which is transmitted by the transmitter coil L through wireless transmission, wherein the resonant wireless power includes a resonant current IRS. In this embodiment, the resonant transmitter circuit 30 further includes a resonant capacitor C which is connected to the transmitter coil L in series; yet, the resonant transmitter circuit 30 is not limited to the circuit structure of this embodiment and may be realized by other forms, for example the transmitter coil L and the resonant capacitor C can be connected in parallel, or there are two or more resonant capacitors connected to the transmitter coil L in series and in parallel. The control circuit 50 generates an impedance control signal CTRL according to a difference between a current reference signal IREF and a resonant current related signal ITX, for controlling the impedance of the variable capacitor circuit 31 to regulate the resonant current IRS or the AC output current IAC substantially at a predetermined current level.

The aforementioned "predetermined" current level may be a fixed value or an adjustable variable which is predefined. Also please note that: although it is the target for the resonant current IRS or the AC output current IAC to be regulated at the predetermined current level, however due to non-idealities of the circuitry caused by for example imperfection of components or imperfect matching among components, the level of the actual resonant current IRS or AC output current IAC may not be exactly equal to the predetermined current level, but just close to the predetermined current level, and therefore the term "substantially" at the predetermined current level should be construed to mean a reasonable range around the predetermined current level.

In this embodiment, as shown in FIG. 3, the resonant current related signal ITX may be obtained by a current sensing circuit which senses a conduction current ISW of the first switching device (for example the switch S1 or S2) and converts the sensed result to the resonant current related signal ITX. In one embodiment, the resonant current related signal ITX may be obtained by a current sensing circuit which is coupled to the resonant circuit and senses the resonant current IRS.

Still referring to FIG. 3, in this embodiment, the variable capacitor circuit 31 includes a varactor CVD, wherein the impedance control signal CTRL is an analog signal which is coupled to a control terminal of the varactor CVD, for controlling the impedance of the varactor CVD in an analog manner to regulate the resonant current IRS or the AC output current IAC substantially at a predetermined current level as described above. By "control the impedance of the varactor CVD in an analog manner", it means that the impedance of the varactor is controllable to change continuously and non-stepwisely. That is, in the controllable range of the impedance of the varactor, the impedance of the varactor presents a continuous curve, not a step curve. On the contrary, to control the impedance of the varactor CVD in a digital manner will be discontinuous, wherein the impedance of the varactor presents a step curve.

The aforementioned varactor may be a voltage controlled varactor (for example a voltage controlled varactor diode), the capacitance of which is adjustable by applying different levels of reverse bias voltages. In this embodiment, the impedance control signal CTRL is coupled to the control terminal of the varactor CVD through a bias resistor RB, while in another embodiment, the bias resistor RB may be omitted.

Figure 4A:
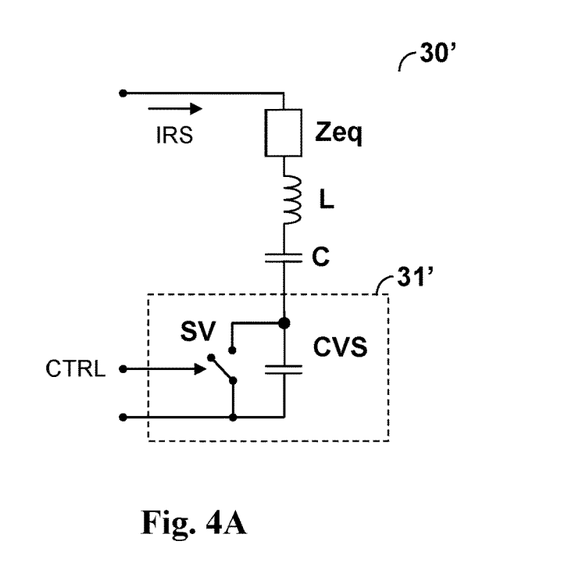
FIG. 4A shows a schematic diagram of a resonant circuit of the wireless power transmitter circuit according to an embodiment of the present invention.

Referring to FIG. 4A, in one embodiment, the variable capacitor circuit 31' of the resonant circuit 30' (corresponding to the resonant circuit 30 shown in FIG. 3) includes a capacitor and a capacitor switch which are connected to each other (for example but not limited to the capacitor CVS and the capacitor switch SV connected in parallel shown in FIG. 4A). In this embodiment, the impedance control signal CTRL controls the switching of the capacitor switch SV so as to control the impedance of the variable capacitor circuit 31' as well as the impedance of the resonant circuit 30', whereby the resonant current IRS or the AC output current IAC is regulated substantially at a predetermined current level as described above.

Figure 4B:
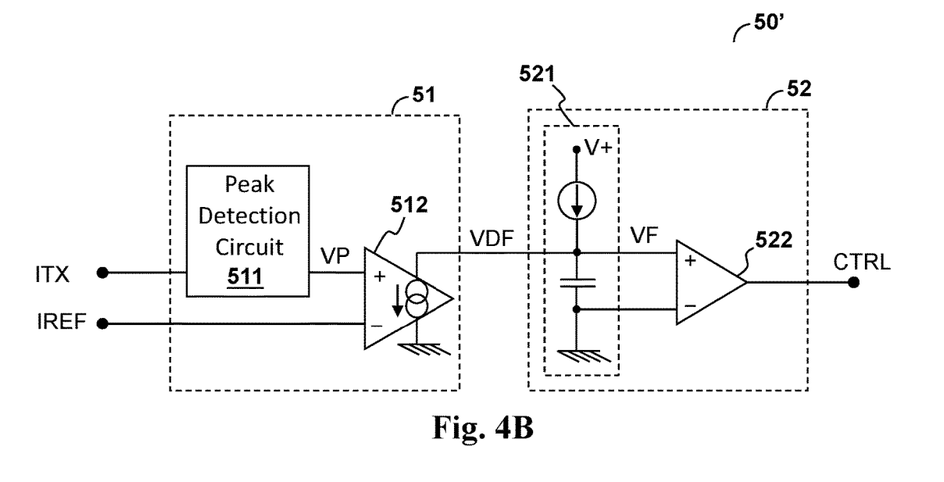
FIG. 4B shows a schematic diagram of a control circuit of the wireless power transmitter circuit according to an embodiment of the present invention.

Referring to FIG. 4B, in one embodiment, the control circuit 50' (corresponding to for example the control circuit 50 shown in FIG. 3) includes a current signal processing circuit 51 and a signal conversion circuit 52. The current signal processing circuit 51 generates a difference signal VDF according to a current reference signal IREF and the resonant current related signal ITX. The signal conversion circuit 52 generates the impedance control signal CTRL according to the difference signal VDF, for controlling the impedance of the variable capacitor circuit 31 to regulate the resonant current IRS or the AC output current IAC substantially at a predetermined current level. The details of the current signal processing circuit 51 and the signal conversion circuit 52 will be described later.

Still referring to FIG. 4B, in one embodiment, the current signal processing circuit 51 includes a peak detection circuit 511 and a transconductance amplifier circuit 512. The peak detection circuit 511 generates a peak current signal VP according to a peak value of the resonant current related signal ITX. The transconductance amplifier circuit 512 generates the difference signal VDF according to the peak current signal VP and the reference current signal IREF. The signal conversion circuit 52 includes an integration filter circuit 521 and a buffer amplifier circuit 522. The integration filter circuit 521 generates a filtered current signal VF by integrating and filtering the difference signal VDF. The buffer amplifier circuit 522 generates the impedance control signal CTRL by buffering and amplifying the filtered current signal VF. In this embodiment, the impedance control signal CTRL may be an impedance control bias voltage for controlling the control terminal of the varactor CVD to control the impedance of the varactor CVD in an analog manner, so as to control the impedance of the variable circuit 31 such that the resonant current IRS or the AC output current IAC is regulated substantially at a predetermined current level.

Not that according to the present invention, the wireless power transmitter circuit (for example the embodiment shown in FIG. 3) regulates the resonant current IRS or the AC output current IAC substantially at a predetermined current level by controlling the impedance of the resonant circuit, instead of controlling the duty cycle of the switching devices of the power inverter circuit by pulse width modulation as in the prior art. Therefore, in the wireless power transmitter circuit according to the present invention, the duty cycle of the switching device(s) of the power inverter circuit can be about 50 time %, so that the resonant current IRS of the wireless power transmitter circuit of the present invention has lower harmonic distortion. That is, the higher order harmonic power of the present invention is less than that of the prior art, so it will not cause damages of other communication systems (for example but not limited to NFC) or other wireless power systems operating by other frequencies. TR avoid short-through (the switches S1 and S2 are conductive at the same time), the aforementioned duty cycle can be set slightly less than 50 time %.

The power inverter circuit 20 shown in FIG. 3 is a half-bridge class D inverter circuit; however, this is only an example and the present invention is not limited to this example. Under the spirit of the present invention, the power inverter circuit of the wireless power transmitter circuit may instead be a full-bridge class D inverter circuit or a class E inverter circuit. For example, referring to FIG. 5, in one embodiment, the power inverter circuit of wireless power transmitter circuit 3 is a full-bridge class D inverter circuit (power inverter circuit 20'), which includes four switching devices (i.e. the switches S1, S2, S3 and S4 shown in the figure). These four switching devices switch by an operating frequency (e.g. 6.78 MHz) to convert the first DC power to an AC output power. Similarly, the control circuit 50 generates an impedance control signal CTRL according to a difference between a current reference signal IREF and a resonant current related signal ITX, for controlling the impedance of the variable capacitor circuit 31 to regulate the resonant current IRS or the AC output current IAC substantially at a predetermined current level. The operation mechanism is similar to the embodiment shown in FIG. 3 and will not be repeated herein.

Besides, in one embodiment, the power inverter circuit of the wireless power transmitter circuit of the present invention may be a selectable power inverter circuit. As an example, referring to FIG. 5, in one embodiment, in relatively lower power applications, the switches S3 and S4 of power inverter circuit 20' are controlled to be constantly non-conductive and conductive respectively (i.e. only the switches S1 and S2 keep switching with the operating frequency), such that the power inverter circuit 20' operates as a half-bridge class D inverter circuit, which can reduce power consumption. Please refer to FIG. 6 which shows a schematic diagram of an embodiment of the wireless power transmitter circuit according to the present invention (wireless power transmitter circuit 4). The control circuit 50" further generates a mode control signal MCT to control the class D power inverter circuit 20" to operate either as a half-bridge class D inverter circuit or as a full-bridge class D inverter circuit.

Figure 7:
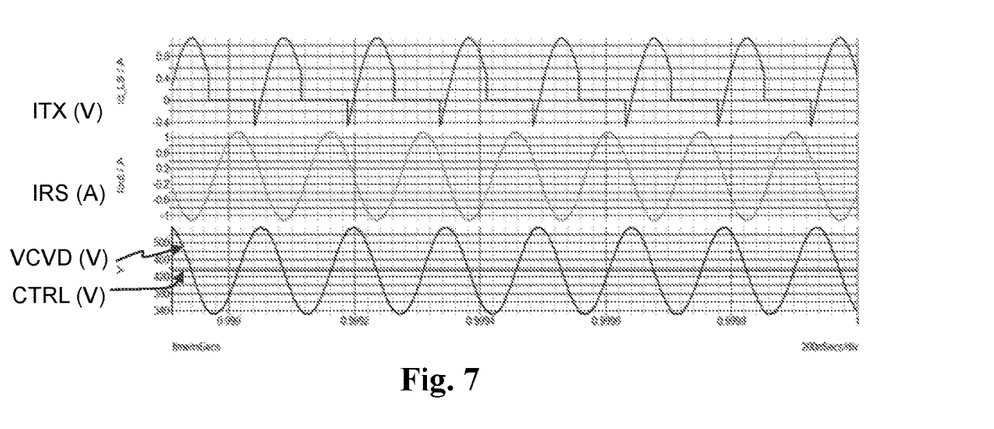
FIG. 7 shows simulation waveforms corresponding to the embodiment as shown in FIG. 3.

FIG. 7 shows simulation waveforms corresponding to the embodiment shown in FIG. 3. The input voltage VS is 12V; the operating frequency is 6.78 MHz; and the reflected resistance of the resonant circuit is 3 ohm, wherein the reflected resistance is the real part of the reflected impedance Zeq of the resonant transmitter circuit 30 shown in FIG. 3. As shown in FIG. 7, although the conduction current ISW (corresponding to the resonant current related signal ITX) of the switch S2 has a phase lag, the resonant current IRS is still regulated at 800 mA by the control mechanism of the present invention. FIG. 7 also shows the waveform of the impedance control signal CTRL for controlling the impedance of the varactor CVD and the waveform of the voltage drop VCVD across the varactor CVD.

Figure 5:
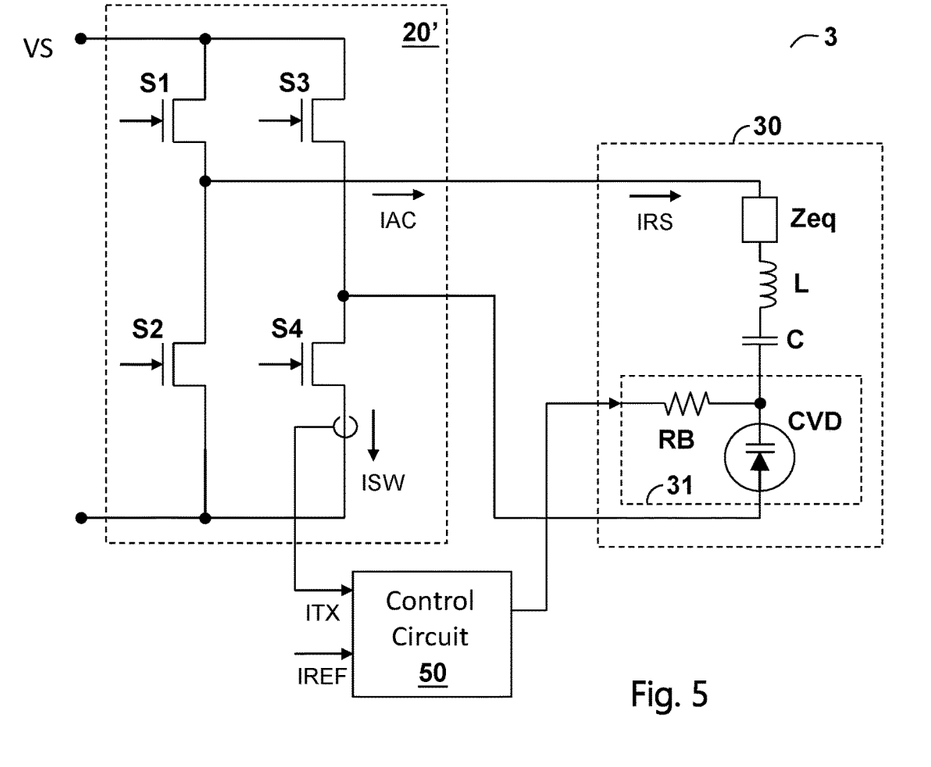
FIG. 5 shows a schematic diagram of a wireless power transmitter circuit according to another embodiment of the present invention.
Figure 6:
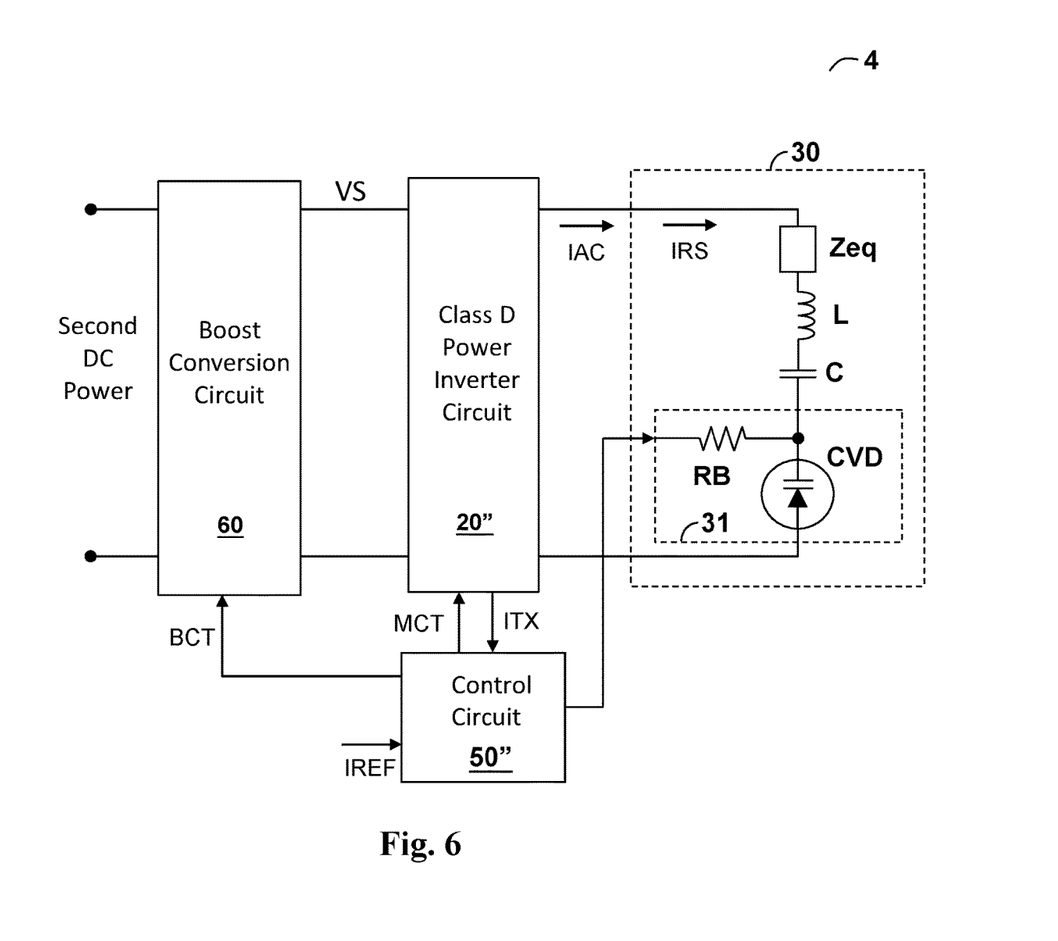
FIG. 6 shows a schematic diagram of a wireless power transmitter circuit according to another embodiment of the present invention.
Figure 8A:
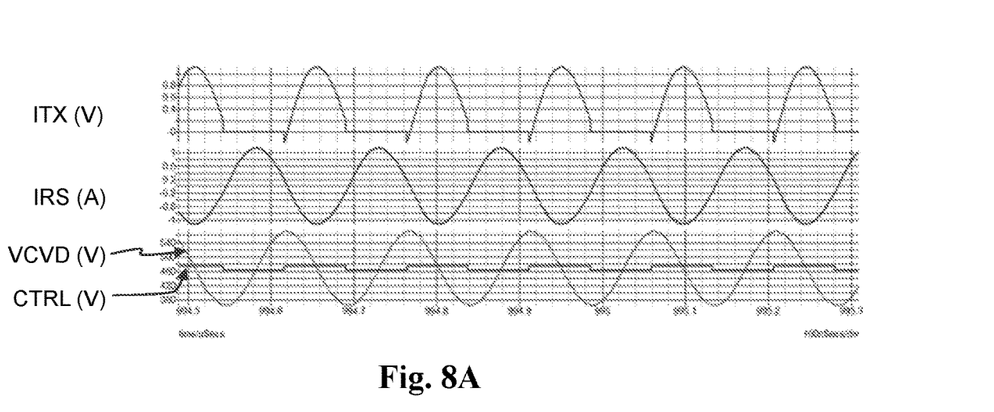
FIGS. 8A and 8B show simulation waveforms corresponding to the embodiment as shown in FIG. 5.
Figure 8B:
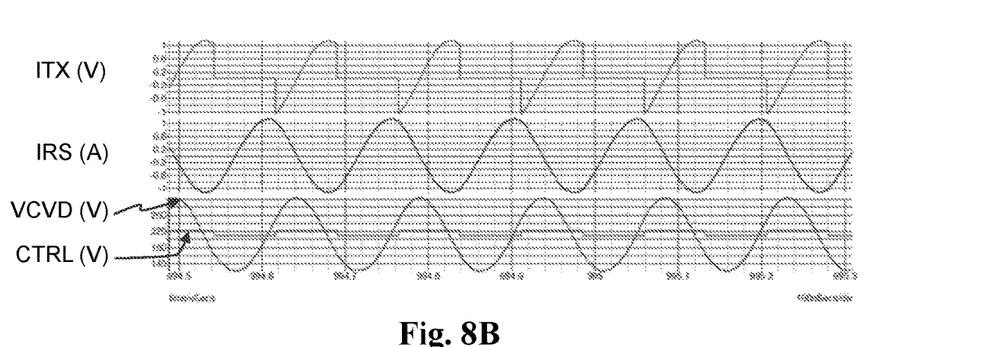

FIGS. 8A and 8B show simulation waveforms corresponding to the embodiment as shown in FIG. 5. Simulation waveforms in FIGS. 8A and 8B correspond to cases wherein the reflected resistance of the resonant transmitter circuit are 10 ohm and 3 ohm respectively, wherein the input voltage VS is 12V and the operating frequency is 6.78 MHz. In FIGS. 8A and 8B, the conduction current ISW of the switch S4 (corresponding to the resonant current related signal ITX) has different levels of phase lag when the reflected resistance is 10 ohm and is 3 ohm. Nevertheless, the resonant current IRS can still be regulated to 800 mA under different reflected resistances. FIGS. 8A and 8B also show the waveform of the impedance control signal CTRL for controlling the impedance of the varactor CVD and the waveform of the voltage drop VCVD across the varactor CVD.

Note that the simulation waveforms of FIGS. 7, 8A and 8B also reveal the fact that with either a half-bridge class D inverter circuit or a full-bridge class D inverter circuit, the resonant current IRS or the AC output current IAC can be regulated substantially at a predetermined current level (800 mA) according to the present invention.

Also note that the input voltage of the power inverter circuit of the present invention can be fixed or can be relatively lower compared to the prior art because the resonant current is regulated by controlling the impedance of the variable capacitor circuit. From another perspective, the wireless power transmitter circuit of the present invention can use a lower cost power inverter circuit, compared to the prior art operating with the same input voltage level. As an example, the prior art wireless power transmitter circuit 1 may need to use a full-bridge class D inverter circuit, when the reflected resistance is relatively higher. In contrast, the wireless power transmitter circuit of the present invention can use a half-bridge class D inverter circuit under the same input voltage and reflected resistance, which costs lower than the prior art.

As mentioned earlier, the power inverter circuit of the wireless power transmitter circuit of the present invention can achieve constant current control for different reflected resistance with a fixed or a relatively low input voltage. Yet in higher power conditions, the wireless power transmitter circuit of the present invention can also include a voltage conversion circuit prior to the power inverter circuit for providing for example but not limited to a higher DC voltage to the power inverter circuit for wireless power transmission with higher power. Still referring to FIG. 6, in one embodiment, the wireless power transmitter circuit 4 includes a boost converter circuit 60 coupled with the power inverter circuit 20. The boost converter circuit 60 converts a second DC power to the first DC power (corresponding to VS) to provide a higher voltage to the power inverter circuit 20 for performing the aforementioned power conversion.

The present invention has been described in considerable detail with reference to certain preferred embodiments thereof. It should be understood that the description is for illustrative purpose, not for limiting the scope of the present invention. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. As an example, the "varactor" and the "capacitor and the capacitor switch" can be used together in the variable capacitor circuit, such that the wireless power transmitter circuit can have the advantages of these two types of circuits at the same time. As another example, the "boost conversion circuit" and a stand-alone "half-bridge class D inverter circuit", "full-bridge class D inverter circuit", or "class E inverter circuit" can be used together, such that the wireless power transmitter circuit can meet different requirements with different combinations. The wireless power transmitter circuit may include combinations of circuits of two or more of the aforementioned embodiments. Furthermore, those skilled in this art can readily conceive variations and modifications within the spirit of the present invention. For example, in the aforementioned embodiment shown in FIG. 4B, though current mode circuits (for example but not limited to the current signal processing circuit 51 and a signal conversion circuit 52) are used to illustrate the embodiment, voltage mode circuits can alternatively be used for realizing the same functions according to the spirit of the present invention. As another example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. The spirit of the present invention should cover all such and other modifications and variations, which should be interpreted to fall within the scope of the following claims and their equivalents.

What is claimed is:

1. A wireless power transmitter circuit, comprising:
    a power inverter circuit which includes at least a first switching device, and is configured to operably convert a first DC power to an AC output power, wherein the AC output power includes an AC output current;
    a resonant transmitter circuit which includes at least a transmitter coil and a variable capacitor circuit, and is configured to operably convert the AC output power to a resonant wireless power, wherein the resonant wireless power includes a resonant current; and
    a control circuit, configured to operably generate an impedance control signal according to a difference between a current reference signal and a resonant current related signal, for controlling an impedance of the variable capacitor circuit to regulate the resonant current or the AC output current substantially at a predetermined current level, wherein the resonant current related signal is a signal related to the resonant current.

2. The wireless power transmitter circuit of claim 1, wherein the variable capacitor circuit includes a varactor, and the impedance control signal is an analog signal which is coupled to a control terminal of the varactor to control the impedance of the varactor in an analog manner wherein the impedance of the varactor is controllable to change continuously and non-stepwisely.

3. The wireless power transmitter circuit of claim 2, wherein the control circuit includes:
    a peak detection circuit, configured to operably generate a peak current signal according to a peak value of the resonant current related signal;
    a transconductance amplifier circuit, configured to operably generate a difference signal according to the peak current signal and a reference current signal;
    an integration filter circuit, configured to operably generate a filtered current signal by integrating and filtering the difference signal; and
    a buffer amplifier circuit, configured to operably generate an impedance control bias voltage according to the filtered current signal, for controlling the control terminal of the varactor so as to control the impedance of the varactor in the analog manner wherein the impedance of the varactor is controllable to change continuously and non-stepwisely;
    wherein the impedance control signal includes the impedance control bias voltage.

4. The wireless power transmitter circuit of claim 1, generating the resonant current related signal according to a conduction current of the switching device.

5. The wireless power transmitter circuit of claim 1, wherein the variable capacitor circuit includes a capacitor and a capacitor switch which are connected to each other, and the impedance control signal controls the switching of the capacitor switch for controlling the impedance of the variable capacitor circuit.

6. The wireless power transmitter circuit of claim 1, wherein the power inverter circuit is a half-bridge class D inverter circuit, a full-bridge class D inverter circuit, or a class E inverter circuit.

7. The wireless power transmitter circuit of claim 1, wherein the duty cycle of the first switching device is substantially 50 time % and is slightly less than 50 time %.

8. The wireless power transmitter circuit of claim 1, wherein the power inverter circuit includes at least four switching devices which include the first switching device, and the control circuit generates a mode control signal for controlling the four switching devices such that the power inverter circuit includes one of the following operation modes:
    (1) one of the four switching devices is constantly conductive and another one of the four switching devices is constantly non-conductive, such that the power inverter circuit operates as a half-bridge class D inverter circuit; or
    (2) the four switching devices operate as a full-bridge class D inverter circuit.

9. The wireless power transmitter circuit of claim 1, further including a boost converter circuit, wherein the control circuit generates an operation control signal for controlling the boost converter circuit to convert a second DC power to the first DC power.

10. A control circuit, configured to operably control a wireless power transmitter circuit which comprises: a power inverter circuit including at least a first switching device, and being configured to operably convert a first DC power to an AC output power, wherein the AC output power includes an AC output current; and a resonant transmitter circuit which includes at least a transmitter coil and a variable capacitor circuit, and is configured to operably convert the AC output power to a resonant wireless power, wherein the resonant wireless power includes a resonant current; the control circuit comprises:
    a current signal processing circuit, configured to operably generate a difference signal according to a current reference signal and a resonant current related signal, wherein the resonant current related signal is a signal related to the resonant current; and
    a signal conversion circuit, configured to operably generate an impedance control signal according to the difference signal, for controlling the impedance of the variable capacitor circuit to regulate the resonant current or the AC output current substantially at a predetermined current level.

11. The control circuit of claim 10, wherein the variable capacitor circuit includes a varactor, and the impedance control signal is an analog signal which is coupled to a control terminal of the varactor to control the impedance of the varactor in an analog manner wherein the impedance of the varactor is controllable to change continuously and non-stepwisely.

12. The control circuit of claim 11, wherein the current signal processing circuit includes:

a peak detection circuit, configured to operably generate a peak current signal according to a peak value of the resonant current related signal; and a transconductance amplifier circuit, configured to operably generate the difference signal according to the peak current signal and the reference current signal;

and wherein the signal conversion circuit includes:

an integration filter circuit, configured to operably generate a filtered current signal by integrating and filtering the difference signal; and a buffer amplifier circuit, configured to operably generate an impedance control bias voltage according to the filtered current signal to control the control terminal of the varactor so as to control the impedance of the varactor in the analog manner wherein the impedance of the varactor is controllable to change continuously and non-stepwisely;

wherein the impedance control signal includes the impedance control bias voltage.

13. The control circuit of claim 10, further including a current sensing unit which is configured to operably generate the resonant current related signal according to a conduction current of the switching device.

14. The control circuit of claim 10, wherein the variable capacitor circuit includes a capacitor and a capacitor switch which are connected to each other, and the impedance control signal controls the switching of the capacitor switch for controlling the impedance of the variable capacitor circuit.

15. The control circuit of claim 10, wherein the power inverter circuit includes at least four switching devices which include the first switching device, and the control circuit generates a mode control signal for controlling the four switching devices such that the power inverter circuit includes one of the following operation modes:

(1) one of the four switching devices is constantly conductive and another oneof the four switching devices is constantly non-conductive, such that the power inverter circuit operates as a half-bridge class D inverter circuit; or (2) the four switching devices operate as a full-bridge class D inverter circuit.

16. The control circuit of claim 10, wherein the wireless power transmitter circuit further includes a boost converter circuit, wherein the control circuit generates an operation control signal for controlling the boost converter circuit to convert a second DC power to the first DC power.

17. A method for use in controlling a wireless power transmitter circuit which comprises: a power inverter circuit including at least a first switching device, and being configured to operably convert a first DC power to an AC output power, wherein the AC output power includes an AC output current; and a resonant transmitter circuit which includes at least a transmitter coil and a variable capacitor circuit, and is configured to operably convert the AC output power to a resonant wireless power, wherein the resonant wireless power includes a resonant current, the method comprising:

generating a difference signal according to a current reference signal and a resonant current related signal, wherein the resonant current related signal is a signal related to the resonant current; and generating an impedance control signal according to the difference signal, for controlling the impedance of the variable capacitor circuit to regulate the resonant current or the AC output current substantially at a predetermined current level.

18. The method of claim 17, wherein the variable capacitor circuit includes a varactor, and wherein the step of generating the difference signal includes:

generating a peak current signal according to a peak value of the resonant current related signal; and generating the difference signal according to the peak current signal and the reference current signal;

and wherein the step of generating the impedance control signal includes:

generating a filtered current signal by integrating and filtering the difference signal; and generating an impedance control bias voltage according to the filtered current signal to control the control terminal of the varactor so as to control the impedance of the varactor in the analog manner wherein the impedance of the varactor is controllable to change continuously and non-stepwisely;

wherein the impedance control signal includes the impedance control bias voltage.

19. The method of claim 17, wherein the resonant current related signal is generated according to a conduction current of the switching device.

20. The method of claim 17, wherein the variable capacitor circuit includes a capacitor and a capacitor switch which are connected to each other, and the step of controlling the impedance of the variable capacitor circuit includes controlling the switching of the capacitor switch for controlling the impedance of the variable capacitor circuit.

21. The method of claim 17, wherein the power inverter circuit includes at least four switching devices which include the first switching device, and the method further includes generating a mode control signal for controlling the four switching devices such that the power inverter circuit includes one of the following operation modes:

(1) one of the four switching devices is constantly conductive and another one of the four switching devices is constantly non-conductive, such that the power inverter circuit operates as a half-bridge class D inverter circuit; or (2) the four switching devices operate as a full-bridge class D inverter circuit.

22. The method of claim 17, wherein the wireless power transmitter circuit further includes a boost converter circuit, and the method further includes generating an operation control signal for controlling the boost converter circuit to convert a second DC power to the first DC power.

* * * * *